United States Patent [19]

Gastaud

[11] 3,862,195

[45] Jan. 21, 1975

[54] STEROID DERIVATIVES AND THE PREPARATION THEREOF

[75] Inventor: Jean Marie Gastaud, Monaco, England

[73] Assignee: Societe Anonyme Francaise Theramex, Paris, France

[22] Filed: June 15, 1971

[21] Appl. No.: 153,399

[30] Foreign Application Priority Data
June 17, 1970 Great Britain.................... 29441/70

[52] U.S. Cl........... 260/397.4, 260/397.45, 424/242
[51] Int. Cl........................................... C07c 169/32
[58] Field of Search..................... 260/397.4, 397.45

[56] References Cited
UNITED STATES PATENTS
3,523,126   8/1970   Boswell, Jr...................... 260/397.4
3,527,866   9/1970   Miki et al. ....................... 260/397.4

*Primary Examiner*—Elbert L. Roberts

[57] ABSTRACT

As new compounds 17-beta-alkyl-phenoxyacetates of 19-norandrostenolone or 19-nor-testosterone of the formula:

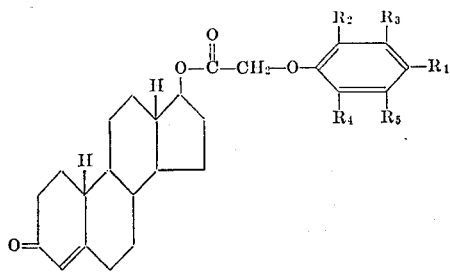

in which $R^1$ is a primary, secondary or tertiary alkyl group of less than 12 carbon atoms and $R^2$, $R^3$, $R^4$, and $R^5$ are the same or different and each is either hydrogen, chlorine or a methyl group. The compounds have anabolic or androgenic activity.

18 Claims, No Drawings

STEROID DERIVATIVES AND THE PREPARATION THEREOF

This invention is concerned with novel steroid derivatives, the preparation thereof, and pharmaceutical compositions containing them.

It has now been found that certain derivatives (as hereinafter defined) of 19-norandrostenolone or 19-nor-testosterone (or "nandrolone"possess marked physiological activity, in particular anabolic or adrogenic activity, as evidenced by in vivo tests.

According to the invention, therefore, there are provided as new compounds, 17-beta-alkylphenoxyacetates of nandrolone of the formula:

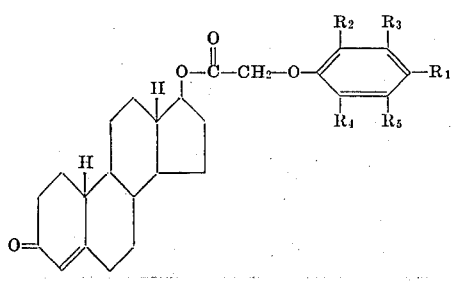

in which $R^1$ is a primary, secondary or tertiary alkyl group, preferably containing less than twelve carbon atoms (e.g., a methyl, ethyl, n-propyl, n-butyl, n-pentyl, n-hexyl, n-heptyl, isobutyl, isopentyl, isohexyl, isoheptyl, isopropyl, see-butyl, t-butyl or t-pentyl group) or a cycloalkyl group (e.g. a cyclopentyl or cyclohexyl group); and $R^2$, $R^3$, $R^4$ and $R^5$ are the same or are different and each is a hydrogen atom, a chlorine atom or a methyl group.

Liposoluble, injectable esters of nanrolone (19-nortestosterone) are well known. Some (e.g., the phenyl propionate) have a relatively short activity and others action (e.g. the decanoate, undecanoate and hexoyl-phenyl-propionate) have a prolonged activity. Besides enhancing and prolonging the effects of nandrolone, esterification serves to dissociate the anabolic properties of nanrolone from its androgenic properties but the quality and degree of this dissociation vary from one ester to another.

Nanrolone and its esters are practically inactive when administered orally, at least when substituted only at the 17-alpha position. Finally, it is known that the 17-beta-penoxyacetate of nandrolone possesses, when administered by injection, a good anabolising activity and a relatively marked androgenic activity, both of short duration. Its use in therapy is nevertheless limited by the absence of activity when administered by the oral route and by its mediocre liposolubility (less than 2.5% in olive oil).

The new esters of nandrolone in accordance with the invention generally have a better solubility in pharmacologically acceptable oils than the brown esters and some of them are active when administered orally and/or parenterally. In general the new esters have a high anabolic activity (varying from ester to ester) than androgenic activity.

The new esters may also be capable of acting as topical agents or local antagonists, for example to the catabolishing effects of the corticosteroids. Further, the new esters generally have a prolonged activity (varying from one compound to another), both after intramuscular injection or oral absorption, and after application to the surface of mucous membranes or the skin.

It is believed that some of these properties are caused by increasing the molecular weight of the phenoxyacetic acid by a substutient (linear, branched or cyclic) in the para position or others are due to substitution (Cl or $CH_3$) on the phenyl nucleus of the esterifying acid.

Twenty six new esters in accordance with the invention are more precisely identified in Table I below.

TABLE I

| Compound No. | $R_1$ | $R_2$ | $R_3$ | $R_4$ | $R_5$ | Appearance |
|---|---|---|---|---|---|---|
| 1 | n-butyl | H | H | H | H | oil |
| 2 | sec-butyl | H | do. | do. | do. | yellow oil |
| 3 | ter-butyl | H | do. | do. | do. | oil |
| 4 | ter-butyl | Cl | do. | do. | do. | white amorphous powder |
| 5 | ter-butyl | $CH_3$ | do. | do. | do. | oil |
| 6 | n-pentyl | H | do. | do. | do. | oil |
| 7 | n-heptyl | H | do. | do. | do. | yellow oil |
| 8 | do. | Cl | do. | do. | do. | thick oil |
| 9 | do. | $CH_3$ | do. | do. | do. | oil |
| 10 | do. | $CH_3$ | do. | $CH_3$ | do. | crystals (m.p. 83-84°C) |
| 11 | do. | Cl | do. | Cl | do. | white crystals, acicular m.p. 99.9°C |
| 12 | do. | Cl | do. | $CH_3$ | do. | crystals (m.p. 83-84°C) |
| 13 | p-cyclohexyl | H | do. | H | do. | crystals (m.p. 105°C) |
| 14 | do. | Cl | do. | do. | do. | white powder (m.p. 117°C) |
| 15 | do. | $CH_3$ | do. | do. | do. | amorphous white powder |
| 16 | do. | $CH_3$ | $CH_3$ | do. | do. | white powder m.p. 109.3°C |
| 17 | do. | $CH_3$ | H | $CH_3$ | do. | solid oil |

A further feature of the invention provides a pharmaceutical composition comprising a steroid derivative in accordance with the invention in association with a pharmaceutical carrier or diluent.

The pharmaceutical compositions of the invention may be formulated for administration by injection, e.g., as solution of the active ingredient in sterile pyrogen-free water or solutions or suspensions in an injectible oil. The composition may also be formulated for oral administration for example as syrups, elixir, dragees, capsules (containing either the solid ingredient or a solution or suspension thereof in a suitable liquid), pills and tablets comprising the active ingredients together with one or more conventional pharmaceutical exipients. The compositions may also be formulated as suppositories or may be formulated for topical administration as a cream or the like.

The new compounds of the invention may be prepared by the esterification of norandrolone, in solution in pyridine, with the appropriate alkylphenoxyacetyl chloride corresponding at ambient temperature or with the appropriate alkylphenoxyacetic acid anhydride at about 70°C. It has been found that greatly increased yields are obtained when the anhydride rather than the acid chloride is used when the phenyl nucleus is mono- or di- substituted at the 2,3,5 and/or 6 positions.

In order that the invention may be well understood, the following Examples are given by way of illustration only.

EXAMPLE 1

19-nortestosterone-17-beta para-sec-butylphenoxyacetate.

(Compound No. 2)

5 Grams (226.7 mM) of freshly distilled para-sec-butyl-phenoxyacetic acid chloride is added dropwise to a solution of 4 grams (14.6 mM) of 19-nortestosterone in 60 cc of anhydrous pyridine at 0°C. The reaction mixture is then allowed to stand with stirring for 66 hours at laboratory temperature and is then diluted with 600 cc of distilled water and extracted with ether. The organic phases are washed with 5% hydrochloric acid and then with distilled water until neutral. After drying over sodium sulphate, the ethereal solution is distilled. The oily residue (7.5 grams) is chromatographed on Kisselgel Elution with an isopropyl benzene-ether mixture (95:5) yields 5.7 grams (yield 84%) of a pale yellow oil which is shown to be homogenous when chromatographed on a thin layer of silica.

| Analysis $C_{30}H_{40}O_4$ | Calculated found | C 77.70% 77.56% | H. 8.60% 8.75% |
|---|---|---|---|
| Infra-red spectrum: | 1.770, 1.740, 1.680, 1.620, 1.590, 1.515 cm$^{-1}$ | | |

EXAMPLE 2

19-nortestosterone-17-beta-para-butylphenoxyacetate.

(Compound No. 3)

Following the procedue of Example 1, 2 grams 19-nortestosterone yield, after chromatography, 1.85 grams (yield 55%) of an oil which which crystallises in isopropyl ether:

m.p. : 106–108° (Kofler).

| Analysis $C_{30}H_{40}O_4$ | calculated % found | C77.70 77.78 | H8.60 8.64 |
|---|---|---|---|
| Infra-red spectrum: | 1.760, 1.675, 1.620, 1.510 cm$^{-1}$ | | |

EXAMPLE 3

19-nortestosterone 17-beta-para-cyclohexylphenozyacetate.

(Compound No. 13)

Following the procedure of example 1, 6 grams of 19-nortestosterone yield 11 grams of an oil which is chromatographed on Kieselgel Elution with benzene gives 9 grams of a crude product which crystallises in hexane. Recrystallisation in the same solvent gives 5.5 grams of crude product which crystallises in hexane. A second (sic) crystallisation allows 5.5 grams of pure product to be isolated (yield 51%).

m.p. : 105° (Kofler)

| Analysis $C_{32}H_{42}O_4$ | calculated % | C 78.33 78.46 | H 8.62 8.65 |
|---|---|---|---|

EXAMPLE 4

19-nortestosterone 17-beta-para-n-heptylphenoxyacetic acid chloride give, after extraction with benzene, 15.4 grams of a brown oil. After chromatography on Kieselgel Elution with a benzene: isopropyl ether mixture (95:5) there are obtained 10.65 grams of a pale yellow oil (yield 96%) which are shown to be homogenous by thin layer chromatography on silica.

| Analysis $C_{33}H_{46}O_4$ | Calculated % found | C 78.30 78.26 | H 9.10 9.05 |
|---|---|---|---|
| Infra-red spectrum: | 1.770, 1.740, 1.660, 1.620, 1.590, 1.520, 1.480, 830 cm$^{-1}$ | | |

EXAMPLE 5

19-nortestosterone 17-beta-(methyl-2'n-heptyl-4') phenoxyacetate (Compound No. 9)

0.663 grams of (methyl-2-n-heptyl-4) phenoxyacetic acid anhydride are added with stirring to 0.247 grams (1mM) of 19-nortestosterone dissolved in 5 cc of anhydrous pyridine and the temperature of the reaction is raised to 70°C. After 16 hours the excess anhydride is destroyed by the addition of 1 cc of distilled water. The reaction mixture is maintained at 70°C with stirring for a further 30 minutes. After cooling, the solution is diluted by 25 cc and extracted with benzene. After washing with 5% hydrochloric acid, drying and distilling to neutrality, the organic phase is dried and distilled. The crude product obtained is chromatographed on Kieselgel. The pure fractions represent 0.402 grams (yield 77%) of a noncrystallisable oil.

EXAMPLE 6

19-nortestosterone 17-beta-(dimethyl-2', 6'n-heptyl-4') phenoxyacetate).

(Compound No. 10)

This derivative is prepared according to the procedure of example 1 using the acid chloride or according to the procedure of example 5 using the acid anhydride. After purification by chromatography the product obtained crystallises in hexane.

m.p. : 83–84° (Kofler)

| Analysis $C_{35}H_{50}O_4$ | calculated % found | C 78.61 77.93 | H 9.42 9.29 |
|---|---|---|---|
| Infra-red spectrum: | 1.760, 1.675, 1.620, 1.480, 1.200, 1.080, 870 cm$^{-1}$ | | |

EXAMPLE 7

19-testosterone 17-beta-(chloro-2'n-heptyl-4'-methyl-6) phenoxyacetate (Compound No. 12)

The processes used are the same as for example 6. After purification by chromatography, the pure product obtained crystallises in hexane.

--- m.p. 83–4° (Kofler)

Analysis $C_{34}H_{47}ClO_4$  calculated %    C 73.57   H 8.53   Cl 6.30
                           found                 74.32       8.55     6.68

Infra-red spectrum: 1.765, 1.200, 860 $cm^{-1}$

---

The compounds prepared in the examples may be summarized as follows, referring to the general formula given above.

| Example | $R^1$ | $R^2$ | $R^3$ | $R^4$ | $R^5$ |
|---|---|---|---|---|---|
| 1 | secondary butyl | H | H | H | H |
| 2 | tertiary butyl | H | H | H | H |
| 3 | cyclo hexyl | H | H | H | H |
| 4 | n-heptyl | H | H | H | H |
| 5 | n-heptyl | $CH_3$ | H | H | H |
| 6 | n-heptyl | $CH_3$ | H | $CH_3$ | H |
| 7 | n-heptyl | Cl | H | $CH_3$ | H |

The compounds of the invention were tested for pharmacological activity in a number of tests.

Firstly, the effect of increasing the molecular weight of the esterifying phenoxyacetic acid was investigated from the point of view of the activity at an arbitrary period of time after administration. The experimental technique used was one of those recommended in brochure No. 1242 of the US Public Health Service (August 1964) "Endocrine Bioassay Data; Androgenic and Myogenic" (pages 5–12). It consists in recording the relationship of the development attained by the androgenic receptors (myogenic, the levator ani muscle) in male rats (castrated at the age of 21 days) treated each day for 10 days with the test substance and sacrificed the day after the last administration.

The figures obtained are given in Table II below. They show the activity of the substances tested in percentages of the activity of the reference standards (testosterone administered by injection, and fluoxymesterone administered orally).

The last columns indicate the values of the relationship between the anabolising and androgenic effects, knowing that, by convention, the value of each of these relationships is 1 for the two reference standards.

The following conclusions may be drawn from the results shown in Table II:

1. Increasing the molecular weight the phenoxyacetate group leads to a general diminution (but only apparent) of the activity of nandrolone phenoxyacetate but this effect is selective and is accompanied by a dissociation between the anabolising activity (less affected) and the androgenic activity (the most reduced).

2. This dissociation is greatest for the longest linear chain (heptyl) and it is less for the shorter chains and for the branched and/or cyclic alkyls.

3. Increasing the molecular weight of the esterifying phenoxyacetic acid relatively improves the activity by the oral rate; and 4. It produces a prolonged duration of activity (this will be more fully discussed below).

In summary, if the ababolic indices of the different esters are considered in isolation of other considerations, it may be said, in general, that:

A. All the compounds are therapeutically useful

B. From the anabolic point of view, the compound of choice appears to be the n-neptyl derivative (compound No. 7), due to its good anabolic androgenic relationship and of the minor character of its absolute androgenic activity.

C. The sec-butyl and tert-butyl derivatives are very active but less dissociated; they can be used where an

TABLE II

ANDROGENIC AND ANABOLISING EFFECTS OF SIX NANDROLONE ALKYL PHENOXYACETATES COMPARISON WITH THE EFFECTS OF 17-BETA -PHENOXYACETATE

| COMPOUND NO. | $R_1$ | VENTRALE PROSTATE | | SEMINAL VESICLES | | LEVATOR ANI | | RA/PV | RA/VS |
|---|---|---|---|---|---|---|---|---|---|
| | | Subcutaneous | orally | Sub-cutaneously | orally | Subcutaneously | orally | SC P.O. | SC P.O. |
| 1 | n-butyl | 10 to 24 | 0.4 | 15 to 53 | 0.4 | 100 to 200 | 0.75 | 10 to 20 | ≈6 |
| 2 | sec-butyl | 5.5 | <1 | 15.3 | <1 | 100 to 150 | ≈1 | 18 to 27 | 6.5 to 10 |
| 3 | ter-butyl | 13.2 | <1 | 38 | <1 | 330 | ≈1 | 13.2 | 8,7 |
| 6 | n-pentyl | 6.3 to 17 | 1.3 | 13 to 46 | 0.6 | 30 to 100 | 2.1 | 6 to 17 | 5 to 7 |
| 7 | n-heptyl | 0.9 | 1 to 2.8 | 3.6 | 0.85 | 50 | 1.7 to 2.7 | 55.6   1 | 14   2 |
| 13 | p-cyclohexyl | 5.5 to 11 | 2.5 | 12 | | 50 to 100 | 4.5 | 18.2   1,8 | 8 |
| control | Standard 17-beta-paenoxyacetate | 18 | <1 | 42 | <0.8 | 400 | ≈1 | 22 | 9,5 | anabolic action with relatively conservative androgenic activity is sought (e.g., in the treatment of asthenia in the man and/or the menopausal woman; or in the treatment of hyperoestrogenism in the young, asthenic or convalescent woman).

D. The duration of the activity of the esters varies with the degree of dissociation of the two activities.

Further experiments were carried out to investigate the derivative of the anabolic and androgenic activity of the new compounds and the level of activity after various periods of time.

The experimental technique employed in these experiments was in principal the same as that described above. The test animals used were adult rats which had been castrated when they had reached a weight of 100 g and they were then treated, after three weeks rest, with a single injection of an equimolar dose of the product to be tested (including the reference standards).

Five animals at a time were sacrificed at different intervals. At each sacrifice, the receptor organs were dissected and weighted. The results shown express the value of the relationship between the average weight of the receptor organs of the treated rats and the average weight of corresponding organs of castrated, untreated control animals.

The duration of the activities (androgenic and anabolic) is judged by the change with time, of the values of these relationships.

Table III below shows results obtained during a similar experiment in which 4 animals were sacrificed at intervals of 10 days and relates to tests for 8 different nandrolone esters. All the results were, of course, ensured by the control of statistical calculation.

An analysis of the above results shows:

1. The existence of a variable dissociation between the androgenic activity (P.V.) and the anabolic activity (R.A.) of the various alkylphenoxyacetates.

For example, at day 10, the androgenic of n-heptyl phenoxyacetate is almost 3 times less, but the anabolic effect is distinctly greater, than those of the unalkylated phenoxyacetate standard.

2. The variable character of the duration and intensity of the androgenic activity from one compound to another as shown by Table IV below

TABLE IV

| TYPE OF EFFECT | EXAMPLE | DAY 10 | DAY 20 | DAY 30 |
|---|---|---|---|---|
| Intense but brief | standard phenoxyacetate | 4.8 | 1.35 | — |
| Intense, more lasting | tert-butylphenoxyacetate | 5 | 4.17 | 1.85 |
| Average, lasting | n-butylphenoxyacetate | 3.6 | 2.4 | 3.3 |
| Weak, relatively brief | n-heptylphenoxyacetate | 1.72 | 1.7 | 1.3 |

3. The rather similar character of the anabolic activity (R.A.) of the esters of the invention in absolute value (which differ markedly in duration) as well as being in correlation with the preceding statement, determines their desired end use in therapeutics as table V below illustrates:

TABLE III

ANDROGENIC (PV = VENTRAL PROSTATE) AND ANABOLISING (R. A. = LEVATOR ANI)
OF SIX NANDROLONE ALKYLPHENOXYACETATES COMPARED, SUBCUTANEOUSLY, TO
NANDROLONE DECANOATE AND PHENOXYACETATE

| | DAY 0 | | DAY 10 | | DAY 20 | | DAY 30 | | DAY 40 | |
|---|---|---|---|---|---|---|---|---|---|---|
| | PV | RA | PV | RA | PV | RA | PV | RA | PV | RA |
| NORMAL CONTROLS | 10.5 | 2.5 | 32.2 | 2.4 | 40 | 29 | 57 | 3 | 66.5 | 3.65 |
| DECANOATE | — | — | 1.65 | 2.01 | 1.66 | 2.6 | 1.17 | 2.4 | 1.10 | 1.68 |
| PHENOXYACETATE (P.A.) | — | — | 4.8 | 1.85 | 1.35 | 1.2 | 1.39 | 1.18 | 1.26 | 1.17 |
| N-BUTYL-P.A. (Compound No.1) | — | — | 3.6 | 1.92 | 2.43 | 2.6 | 3.3 | 2 | 1.89 | 1.66 |
| SEC-BUTYL- P.A. (Compound No.2) | — | — | 4.28 | 2.13 | 2.71 | 2.6 | 1.35 | 1.8 | 1.52 | 1.9 |
| TER-BUTYL-P.A. (Compound No.3) | — | — | 5 | 1.94 | 4.17 | 2.7 | 1.85 | 2.5 | 2.16 | 2.3 |
| N.PENTYL- P.A. (Compound No.6) | — | — | 3.46 | 2.3 | 1.35 | 2.36 | 1.51 | 2.3 | 1.29 | 2.3 |
| N-HEPTYL-P.A. (Compound No.7) | — | — | 1.72 | 2.2 | 1.7 | 2.6 | 1.3 | 2.5 | 1.6 | 2.85 |
| CYCLOHEXYL-P.A. (Compound No.13) | — | — | 3.04 | 2.1 | 4.77 | 2.9 | 1.7 | 2.3 | 1.36 | 2.2 |

The figures representing the value of the relationship R:
R = weight of the organ of the treated animals/weight of the organ of the untreated castrated controls.

TABLE V

| TYPE OF EFFECT | EXAMPLE | DAY 10 | DAY 20 | DAY 30 |
| --- | --- | --- | --- | --- |
| Transitory | standard phenxoy-acetate | 1.85 | 1.2 | 1.18 |
| More lasting | sec-butyl-phenoxy-acetate | 2.13 | 2.6 | 1.8 |
| Lasting | n-heptyl-phenoxy-acetate | 2.2 | 2.6 | 2.5 |

An analysis of the above results confirms that the alkylphenoxyacetic esters of nandrolone are therapeutically useful. They offer, in fact, a range of compound whose degree of dissociation of anabolic and androgenic activities and different durations of activity permit one to choose between substances which have average or intense anabolic and/or androgenic activity and compounds which have short, average or long activity.

Nandrolone n-heptyl phenoxyacetate is probably one of the best of the new esters in view of the intensity and duration of its anabolic activity, its moderate and fugitive androgenic activity and, good solubility. This compound was, accordingly, made the subject of a further comparative experiment. In this experiment which was based on the same technique as described above but involved sacrifices up to the end of the third month after the single injection, nandrolone n-heptyl phenoxyacetate was compared with three other nandrolone esters, widely used in pharmaceutics for many years.

Table VI below (of which all the figures are statistically significant between $p<0.05$ and $p<0.001$) gives the results the new alkyl phenoxyacetic ester with respect to conventional derivatives of 19-nor-testosterone from which it is well distinguished by is pharmacological characteristics.

TABLE VI

INTENSITY AND DURATION OF THE ACTIONS

ANDROGENIC (P/V $\mu$ VENTRAL PROSTATE) and ANABOLISING C.R.A. = LEUATOR ANI) OF NANDROLONE N-HEPTYL-PHENOXYACETATE AND OF THREE KNOWN ESTERS OF SAME

| Day after injection | Heptyl-phenoxyacetate | | Decanoate | | Undecanoate | | Hexyloxy-phenyl propionate | |
| --- | --- | --- | --- | --- | --- | --- | --- | --- |
| | P.V. | R.A. | R.V. | R.A. | P.V. | R.A. | P.V. | R.A. |
| 7th | 2.7 | 2.5 | 6 | 2.5 | 2.9 | 2.6 | 3.6 | 2.1 |
| 14th | 3.2 | 3.3 | 5.3 | 3.4 | 2.1 | 3.2 | 4.7 | 3.4 |
| 21st | 2.6 | 3.5 | 3.6 | 3.5 | 3.2 | 3.2 | 3.2 | 4.4 |
| 28th | 2.2 | 3.2 | 2.6 | 2.8 | 2.3 | 3.2 | 3.6 | 3.4 |
| 35th | 2.8 | 3.2 | 4.9 | 2.9 | 2.2 | 2.7 | 3.9 | 2.6 |
| 2nd | 2 | 3.4 | 3.4 | 2.95 | 2 | 3.3 | 5 | 3.9 |
| 52nd | 1.9 | 2.9 | 3.1 | 2.4 | 2.3 | 2.35 | 2 | 2.3 |
| 64th | 2.2 | 3.5 | 2.4 | 2.55 | 1.7 | 3.15 | 2.6 | 3.7 |
| 77th | 1.9 | 3.3 | 1.9 | 2.60 | 2.2 | 2.7 | 2 | 3 |
| 91st | 1.76 | 2.3 | 1.6 | 1.5 | 1.86 | 3.1 | 1.86 | 2.1 |

It may be seen from table VI that n-heptyl phenoxyacetate possesses:

a. an anabolic activity having the strongest average intensity (i.e., 3.11 against 2.95, 2.82 and 2.80):

b. a duration of full anabolic activity greater than that of the decanoate ester (i.e., 91 days against 77);

c. an androgenic activity having one of the most reduced average intensities (i.e., 2.15 which is near 2.10 but less than 3.2 and 3.91) and d. an androgenic activity having the shortest duration of all (i.e., 35 days against 42 days, 52 days and 64 days).

These determinations are apparent from Table VII below:

TABLE VII

QUALITY AND DURATION OF THE ANDROGENIC AND ANABOLISING EFFECTS OF NANDROLONE N-HEPTYL-PHENOXYACETATE AND OF THREE KNOWN ESTERS OF THE SAME

| | Heptyl-phenoxyacetate | | Decanoate | | Undecanoate | | Hexyloxy-phenyl proprionate | |
| --- | --- | --- | --- | --- | --- | --- | --- | --- |
| | P.V. | R.A. | P.V. | R.A. | P.V. | R.A. | P.V. | R.A. |
| Intensity maxima recorded (value of the relationships) | 3.2 | 3.5 | 6.0 | 3.5 | 3.2 | 3.3 | 5.0 | 4.4 |
| Mean Intensity (mean of the values of the relationships) | 2.15 | 3.11 | 3.91 | 2.8 | 2.1 | 2.95 | 3.2 | .82 |
| Duration of the action (until the sinking of the plateau) days | 35 | 91 | 64 | 77 | 52 | 91 | 48 | 91 |

The "therapeutic index" for anabolic activity as compared with androgenic activity can be calculated from the "area of activity" for each activity. The "area of activity" is calculated by multiplying the value of the average intensity by the duration of the plateau of the activity (Table VII). The "relative anabolic index" of each substance, is the value of the relationship:

area of anabolic activity (A.A.A)/area of androgenic activity (a.a.a)

Table VIII gives the resultant indices for the 4 different esters.

A. The very dissociated effects of certain of these compounds substantially affect the case of administration by injection.

a. In the case of compounds Nos. 8 and 9, whose anabolic activity is from 10 to 20% of that of injectible testosterone, their androgenic activity is less than 2% of that of the reference standard.

b. With compounds Nos. 4, 5 and 14, this variation reaches a maximum, thus the anabolic activity of these compounds, by the parenteral route, is from 60 to 120% of the analogous effect of injectible testosterone,

TABLE VIII

RELATIVE THERAPEUTIC VALUE OF NANDROLONE N-HEPTYL PHENOXYACETATE AND OF THREE KNOWN NANDROLONE ESTERS

|  | heptyl-phenoxy-acetate | decanote | undecanoate | hexyloxy phenyl propionate |
|---|---|---|---|---|
| Area of anabolic activity (A.A.A.) | 283.01 | 215.60 | 268.45 | 256.62 |
| Area of androgenic activity (a.a.a.) | 75.25 | 250.24 | 109.20 | 134.40 |
| Relative anabolic index A.A.A. / a.a.a. | 3.76 | 0.86 | 2.45 | 1.90 |

The relative index of n-heptyl phenoxyacetate is by far the best (i.e., 3.76 against 2.45s, 1.90 and 0.86).

The above results conclusions relate only to nandrolone alkylphenoxyacetates not having any substituent on the phenyl nucleus.

Examination of esters substituted in the phenyl nucleus has led to the following conclusions.

I. In general, substitution (i.e. with chlorine or a methyl group) of the phenyl nucleus of the esterifying phenoxyacetic acid reduces the activities as compared with the corresponding non-substituted ester.

II. This reduction affects not only the androgenic activity but also the anabolic activity whether compound is administered by injection or orally.

III. In the case of oral administration, however, the loss of activity is proporionally less than for administration by injection.

IV. The loss of activity resulting from the substitution differs little with the type of substituent (Cl or Me) with the number of substituent (2', 3' or 6').

V. Nucleus substitution does not, however, modify the duration of activity as compared with the non-substituted esters.

VI. Certain esters substituted in the phenyl nucleus offer modifications as compared with the non-substituted corresponding esters with regard to dissociation between their androgenic activity and their anabolic activity. These characteristics are useful in therapeutics.

while their androgenic activities vary from 6 to 66% with respect to those of the standard.

B. Finally other compounds have dissociated activities, by the two routes: parenteral and oral, in favour of the anabolic property.

This is essentially the case of compound No. 11, which, orally, is 10 times less anabolic, but is from 40 to 160 times less androgenic than oral fluoxymesterone.

This spread of biological characteristics makes it possible to choose from among the substituted alkyl phenoxy acetates: anabolically active compounds having little androgenic activity and which are active by the oral route; anabolically active compounds having little androgenic effect and of prolonged duration, for the parenteral route; anabolically active compounds with non-negligible hormonal androgenic properties for the parenteral route (e.g., for the treatment of hypodynamism and thinness in the man and in the climateric woman; and for the treatment of hyperoestogenism in the young woman).

These properties are illustrated numerically in Tables TXA and IXB below, in which the values indicated represent: for the subcutaneous route, the percentage of the corresponding activity of testosterone in S.C. (subcutaneous), and, for the oral route, the percentage of the corresponding activity of oral floxymesterone.

All the figures which served in the calculation of the percentages are statistically significant (between $p$ 0.05 and $p$ 0.001). Most of the results are obtained from a number of different experiments.

TABLES IX

ANDROGENIC AND ANABOLISING EFFECTS OF THE ALKYL-PHENOXYACETATES SUBSTITUTED ON PHENOL, COMPARED WITH THE EFFECTS OF THE CORRESPONDING NON- SUBSTITUTED ESTERS

| Compound No. | A | | | | | | B | | | |
|---|---|---|---|---|---|---|---|---|---|---|
| | ANDROGENIC ACTIONS | | | | ANABOLISING ACTION | | relationship | analobising action / androgenic action | | |
| | Ventral prostrate (P.V.) sub-cutaneously | Orally | Seminal Vesicle. (V.S.) Sub-cutaneously | orally | Levator ani (R.A.) sub-cutaneously | orally | RA/PV subcutaneously | RA/VS subcutaneous | RA/PV oral | RA/VS oral |
| 7 | 0.9 | 1.9 | 3.6 | 0.77 | 50 | 2.2 | 55.5 | 13.8 | 1.1 | 2.8 |
| 8 | 0.7 | 0.9 | 1.75 | 0.6 | 10 | 1.7 | 14.2 | 5.7 | 1.8 | 2.8 |
| 9 | 0.7 | 2 | 2.2 | 0.9 | 16.6 | 2.8 | 23.7 | 7 | 1.4 | 3.1 |
| 10 | ≈0.1 | 2.2 | 1 | 0.76 | 4 | 2.7 | 40 | 4 | 1.0 | 3.5 |
| 11 | 0.6 | 2.7 | 5.9 | 0.6 | 10 | 10 | 16.6 | 1.7 | 3.7 | 16.6 |
| 12 | 0.15 | 1.8 | 0.7 | 0.6 | 4 | 2.7 | 26.6 | 5.7 | 1.5 | 4.5 |
| 13 | 8.25 | 2.5 | 12 | — | 75 | 4.5 | 9.1 | 6.2 | 1.8 | — |
| 14 | 19.2 | 2.4 | 66 | 0.2 | 162 | 2.8 | 8.4 | 2.45 | 1.1 | 14 |
| 15 | 6 | 4.7 | 13.9 | 2.1 | 40 | 8 | 6.6 | 2.8 | 1.7 | 3.8 |
| 16 | 3 | 4.7 | 7.5 | 1.9 | 20 | 8 | 6.6 | 2.6 | 1.7 | 4.2 |
| 17 | 1.4 | 3.5 | 4 | 2.4 | 20 | 8 | 14.2 | 5 | 2.2 | 3.3 |
| 3 | 12.4 | <1 | 31.5 | <1 | 205 | ≈1 | 16.5 | 6.5 | — | — |
| 4 | 7.3 | 1 | 19.3 | 0.9 | 83 | 2.7 | 11.3 | 4.3 | 2.7 | 3 |
| 5 | 5.9 | 2 | 14.1 | 2.5 | 62.5 | 5 | 10.5 | 4.4 | 2.5 | 2 |

The new compounds of the invention are useful in three clinical fields and by three different routes.

1. Anabolic medicaments, not very androgenic with prolonged actions intended for the well known indications of that therapeutic class (thinness, malnutrition, asthenia, convalescence, decalcification of the skeleton, retardation and insufficience of growth, senescence, etc.).

A. By the Intra-muscular route
n-heptyl)phenoxyacetate (compound No. 7)
n-pentyl-phenoxyacetate (compound No. 6)
p-cyclohexyl-phenoxyacetate (compound No. 13)
n-heptyl 2'-chloro-phenoxyacetate (compound No. 8)
n-heptyl 2'-methyl)phenoxyacetate (compound No. 9)

CASE HISTORIES

Bad general state with emaciation (39 kg for 160 cm), severe anorexia asthenia, anemia, in a woman of 30 who has suffered since the age of 15 from a painful entero-urinary and gynecological syndrome of an infectious nature; the sick woman is permanently on antibiotics and other disinfectants, which she can tolerate less and less. An ampoule, injectable intramuscularly, containing 92.3 mg of n-heptyl-phenoxyacetate (=50 mg nandrolone base) in 1 ml olive oil is administered on the 5th day of the cycle for two consecutive cycles. Two months after the first injection, the weight found is greater by 3.2 kg than the initial weight (42.4 kg) in spite of a recent infectious episode and stomatite allergic to the last sulfamides absorbed. The other symptoms have disappeared (asthenia, anemia, anorexia) and there was no side effect whatever.

Equally favourable results in the same group of therapeutic signs were obtained in 20 other similar cases, and (a) in 5 men and 2 woman aged from 18 to 68, after 2 to 4 intra-muscular injections at 15 day intervals of one ampoule each time, containing 87.7 mg n-pentyl-phenoxyacetate (=50 mg nandrolone base), in 1 ml of olive oil; (b) in 2 men and 3 women, aged from 23 to 57, after 3 to 5 intra-muscular injections at 20 day intervals on the average, of one ampoule each time containing 80 mg p-cyclohexylphenoxyacetate (=50 mg of nandrolone base) in 1 ml of a solvent composed of 55 parts of olive oil and 45 parts benzyl benzoate.

B. By the oral route n-heptyl 2',6'-dichloro-phenoxyacetate (compound No. 11) EXAMPLE Boy of 11 years and 4 months. Very difficult recuperation six weeks after the end of an acute febrile infection of undetermined origin, apparently viral, with dominant respiratory symptomatology. obstinate anorexia causing a weight loss in the order of 5 kg (33.5 kg for 148 cm); anemia with 3,680,000 red corpuscles with 85% hemoglobin after hepatotherapy and vitamins. For 20 days the sick boy then takes twice a day one spoonful of a syrup which contains in suspension as only medicament, per spoonful: 21mg n-heptyl 2',6'-dichloro-phenoxyacetate (compound No. 11) previously group (=10 mg of nandrolone base). The asthenia and the anorexia dissappear before the 20 days and the anemia corrects itself (4,250,000 corpuscles with 92% hemoglobin). The recuperation is at the end final, the child returns to school; five weeks after the start of the therapeutic the weight deficit is reduced by half (36 kg for 148.5cm).

Results of similar quality have been recorded with the same compound administered orally, either in the form of suspension, or in the form of cuttable compressed tablets of 21 mg (=10mg of nandrolone base), with various ways of anabolising medication. These trails concerned: (a) 8 adults of the two sexes, aged from 19 to 42 (cures from 10 to 20 days; daily posology from 20 to 40 mg, expressed in nandrolone base); (b) 6 children of the two sexes aged from 8 to 13 (cures from 10 to 20 days, daily posology from 10 to 20 mg expressed in nandrolone base).

2. Anabolising Medicaments, Moderately Androgenic with Prolonged Action-intended for clinical cases where a conserved hormonal activity is highly desirable:

a. In sexasthenic men, whose deficiency is not a simple consequence of physical and intellectual asthenia (for example in the course of diabetes and in the sixities).

b. In menopausal women, where the oestrogens are incapable of compensating the asthenia without the aid of the androgens on the one hand, and where, on the other hand, the presence of a hormonal androgenic effect is at the same time a non-negligeable hypophysofreinator ((?)) element and a peripheral anatagonist of certain undesirable uterine effects of the oestrogens.

c. In women in genital activity ((gestation ?)) suffering from gynecological hyperoestrogenic troubles where a pure androgen has too considerable risks of virilisation and where a conventional anabolisant risks causing excessive overweight without offering exchange a sufficient antagonistic hormonal effect. In this latter group of indications recourse has already been made to certain progestatives, all derivatives substituted at 17 alpha of nandrolone, but it is known that this type of substitution gives the steroids a hepatic toxicity which cannot be ignored, from whence the interest and the originality of nandrolone 17-beta-alkyl-phenoxyacetates.

A. By the intra-muscular route
-ter-butyl phenoxyacetate (compound No. 3)
-sec-butyl)phenyloxyacetate (compound No. 2)
-n-butyl) phenoxyacetate (compound No. 1)
-ter-butyl 2'chloro-phenoxyacetate (compound No. 4)
-ter-butyl 2'-methyl-phenoxyacetate (compound No. 5)
-p-cyclohexyl 2'-chloro-phenoxyacetate (compound No. 14)

EXAMPLES

Man of 41, having contracted during 16 years in Africa several parasitoses (of which paludism and amibase), cured today. Progressive emaciation to 55.6 kg for 162 cm, anorexia, asthenia, (physical, mental, sexual), sadness bordering on nervous depression. The hematologic examination, the lipid balance, the test of tolerance to glucose orally, all give normal results. The sick man receives 4 weekly intra-muscular injections of one ampoule, then 2 injections of 2 ampoules at 20 day intervals, each ampoule containing 95.96 mg p-cyclohexyl 2'-chlorophenoxyacetate (=50 mg nandrolone base) in 1 ml of a solvent made from 55 parts of olive oil and 45 parts of benzyl benzoate. Two and a half months after the start of the treatement the triple asthenia has disappeared the appetite is good, the weight has increased by 2.4 kg and the "entourage" remarks on the euphoric comportment of the sick man who has refound his "joie de vivre" of several years ago.

Comparable results, in the same group of therapeutic indications were obtained:

a. in 4 menopausal women, aged from 56 to 70, tin, asthenic, having received 4 to 6 intra-muscular injections every 15 days from an ampoule identical to that of the above example;

b. in another menopausal woman, aged 64, and in 4 men aged 22,36,42 and 58, there two latter prediabetics, having received every 10 then every 15 days an intra-muscular injection of 84.4 mg n-butyl-phenoxyacetate (=50 mg nandrolone base), in toto 5 injections on the average (3;5;5;7).

EXAMPLES

Woman aged 28, multi-copying machine maker, living more than 1 hour by transport from her place of work. Neurotonia, asthenia, those latter increased by menorrhagic periods (8 days of which 3 at the limit of compatibility with a professional activity) and by a premenstrual congestive mammary and pelvic syndrome lasting 10 days.

The uterus has the dimensions of a grape fruit and the annexes are sensitive.

As soon after the end of the periods, intra-muscular injection of one ampoule containing 42.4 mg ter-butyl-phenoxyacetate (=25 mg nandrolone base) in 1 ml olive oil. Net attenuation of the objective and subjective symptoms caused. Dissipation of the asthenia without gain in weight. Second injection, indentical, as soon after the subsequent periods. The disappearance of the premenstrual syndrome the fact that the periods were reduced to 5 days and that they were of substantially normal intensity were noted. The same results were maintained during the subsequent cycle without repetition of the treatment.

Similar results were obtained in hyperoestrogenic manifestations;

a. in 8 women subjected to the same treatment;

b. in 4 women aged from 19 to 33, having received at the start of 2 to 3 consective cycles, an intra-muscular injection of 42.4 mg sec-butyl-phenoxyacetate (=25mg nandrolone base) in olive oil;

c. in 5 women aged from 18 to 41, having received at the start of 3 consecutive cycles (6th. to 9th. days) each time 45.5 mg ter-butyl-2'-chloro-phenoxyacetate (=25mg nandrolone base) an 1 ml olive oil.

B By the oral route
-p-cyclo-hexyl-2'-methyl-phenoxyacetate (compound No. 15)
-p-cyclohexyl-2'-, 3'dimethyl-phenoxyacetate (compound No. 16)
-p-cyclohexyl-2', 6'-dimethyl-phenoxyacetate (compound No. 17)

EXAMPLES

Woman of 31, hyperoestrogenic menometrochagies, pelvic pains, premenstrual mammary tension). Two years previously, left ovarectomy for cysts. Bad toleration of the oestroprogestatives on the double plan, general and gynecological. Neurotonia, irritability, insomnia, asthenia. Uterus of the volume of an orange, right annex sensitive. From the 20th. to the 26th. day of 2 consecutive cycles, 2 times a day one compressed tablet dosed at 46.2mg of p-cyclohexyl-2'-methyl-phenoxyacetate (=25mg nandrolone base), previously comminuted. The subjective troubles disappear under treatment and reappear very severely the following cycle, untreated. General state and behaviour normalised. Uterus reduced in volume (mandarin).

Comparable results are obtained in similar cases:

a. in 6 other young hyperoestrogenic women, with the same medicament at doses of 1 to 3 compressed tablets daily, at the same time as the cycle;

b. in 4 women aged from 23 to 33, having recieved from 1 to 4 compressed tablets per day, from the 20th.

to the 26th day of the cycle, 2 and 3 consecutive cycles, each compressed tablet containing 47.2mg p-cyclohexyl-2',3'-dimethyl-phenoxyacetate (=25mg nandrolone base)previously comminuted.

3. Topic medicaments with protective action

The anabolisants were used in the form of creams or collyria with a cicatrisive action and also with the aim of compensating the inhibitive effects exerted by the anti-inflammatory corticosteroids on the repair of wounds (burns, transplants etc.).

All the alkyl-phenoxyacetates described here can be used for this purpose. Their specific interest is to act for a prolonged duration, Which permits the spacing of the annoying repetition of the applications. A supplementary interest is carried by the substituted alkyl-phenoxyacetates, where the presence of chlorine or of the $CH_3$ group increases the epithelial affinity of the products.

EXAMPLES

1. Woman of 67, confined to bed by chromic rheumatoid polyarthrhitis and subjected for 2 years to cortico-therapy by general route. Bad general state. Appearance of an ulceration 7 cm. diameter in the right lumbar sacral region. Nursing and conventional local cares improved the appearance of the sore, but the cicatrisation is very retarded by virtue of the pursuit of the corticoids. There is the applied every day onto the eschar a cream (oil type emulsion in conventional "O/W" water) containing 9.1 mg ter-butyl 2'-chlorophenoxyacetate (=5mg of nandrolone base) per gram of cream. 25 days after the start of the treatment the cicatrisation of the sore is practically complete.

Very substantially similar results are obtained in 20 and 28 days respectively, thanks to the same treatment with two other sick persons aged 58 and 76 having atonic ((?)) Sores following prolonged corticotherapy prescribed to combat chronic respiratory deficiencies.

2. Corneal ulceration of 3mm caused the very same day by a clumsy movement of her yound child. The application of an antiseptic collyrium causes in about ten days the disappearance of the pains, but the ulceration remains unchanged. Complete cicatrisation is obtained on the 6th. day of conjunctival instillations morning and evening of one or two drops of a sterile solution containing per milliliter of olive oil 9.6 mg p-cyclohexyl-2'-chloro-phenoxyacetate (=5mg nandrolone).

Comparable results were obtained with the same medication and the same posology in 4 other cases of accidental corneal ulceration.

What we claim is:
1. Compounds of the general formula:

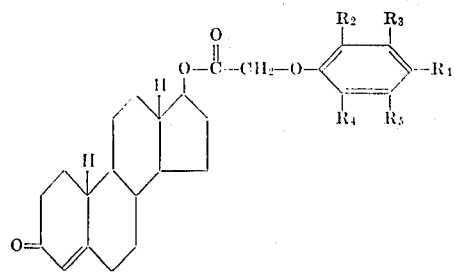

$R_1$ is selected from the group consisting of cyclopentyl and cyclohexyl, $R^2$, $R^3$, $R^4$ and $R^5$ are the same or are different and are selected from the group consisting of a hydrogen atom, a chlorine atom and a methyl atom.

2. 19-Nor-testosterone-17-beta-para-n-butyl-phenoxyacetate.

3. 19-Nor-testerone-17-beta-para-sec-butyl-phenoxyacetate 4. 19-Nor-testosterone-17-beta-para-tert.-butyl-phenoxyacetate.

5. 19-Nor-testosterone-17-beta-(2'-chloro-1-tert-butyl)-phenoxyacetate.

6. 19-Nor-testosterone-17-beta-(2'-methyl-4'-tert-butyl)-phenoxyacetate.

7. 19-Nor-testosterone-17-beta-para-n-pentyl-phenoxyacetate.

8. 19-Nor-testosterone-17-beta-para-n-heptyl-phenoxyacetate.

9. 19-Nor-testosterone-17-beta-(2'-chloro-4'-n-heptyl)-phenoxyacetate.

10. 19-Nor-testosterone-17-beta-(2'-methyl-4'-n-heptyl)-phenoxyacetate.

11. 19-Nor-testosterone-17-beta-(2',6'-dimethyl-4'-n-heptyl)-phenoxyacetate.

12. 19-Nor-testosterone-17-beta-(2',6'-dichloro-4'-n-heptyl)-phenoxyacetate.

13. 19-Nor-testosterone-17-beta-(2'-chloro-6'-methyl-4'-n-heptyl)-phenoxyacetate.

14. 19-Nor-testosterone-17-beta-para-cyclohexyl-phenoxyacetate compound according to the formula of claim 1.

15. 19-Nor-testosterone-17-beta-(2'-chloro-4'-cyclohexyl)-phenoxyacetate compound according to the formula of claim 1.

16. 19-Nor-testosterone-17-beta-(2'-methyl-4'-cyclohexyl)-phenoxyacetate compound according to the formula of claim 1.

17. 19-Nor-testosterone-17-beta-(2',3'-dimethyl-4'-cyclohexyl)-phenoxyacetate compound according to the formula of claim 1.

18. 19-Nor-testosterone-17-beta-(2',6'-dimethyl-4'-cyclohexyl)-phenoxyacetate compound according to the formula of claim 1.

* * * * *